(12) United States Patent
Kang et al.

(10) Patent No.: US 7,649,860 B2
(45) Date of Patent: Jan. 19, 2010

(54) BUFFER-BASED GPS AND CDMA PILOT SEARCHER

(75) Inventors: Inyup Kang, San Diego, CA (US); Christopher Patrick, San Diego, CA (US); Bruce R. Meagher, San Diego, CA (US); Shimman Patel, San Diego, CA (US); Tao Li, San Diego, CA (US); Joseph Cheung, San Diego, CA (US); Pillappakkam Srinivas, San Diego, CA (US); Gregory B. Foerster, San Diego, CA (US); Srinivas Varadarajan, San Diego, CA (US); Jian Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1655 days.

(21) Appl. No.: 10/061,874

(22) Filed: Jan. 31, 2002

(65) Prior Publication Data
US 2003/0142639 A1 Jul. 31, 2003

(51) Int. Cl.
*H04B 7/212* (2006.01)
(52) U.S. Cl. .................. 370/321; 370/311; 370/320; 370/335; 370/337; 370/342; 370/347; 370/442; 375/130; 375/136; 375/137
(58) Field of Classification Search ............... 370/311, 370/320, 321, 335, 337, 342, 347, 442; 375/130, 375/136, 137
See application file for complete search history.

(56) References Cited

U.S. PATENT DOCUMENTS 4,797,877 A * 1/1989 Pope et al. ................. 370/261

(Continued)

FOREIGN PATENT DOCUMENTS

EP 1017183 7/2000

(Continued)

OTHER PUBLICATIONS

International Search Report (Partial)—PCT/US03/02912, Internatioanl Search Authority—European Patent Office—Jan. 31, 2003.

*Primary Examiner*—William Trost, IV
*Assistant Examiner*—Toan D Nguyen
(74) *Attorney, Agent, or Firm*—Howard H. Seo; James K. O'Hare (57) ABSTRACT

A pilot searcher for CDMA and GPS signals. In one aspect, the searcher is operated in conjunction with a sample buffer in a "real-time" or "off-line" mode. The writing/reading of samples to/from the buffer may be performed in a TDM manner via a common port, and samples may be decimated and packed prior to storing in the buffer. In another aspect, the overall search for pilots is partitioned into a number of tasks, with each task corresponding to a search over a given sample segment and based on a particular set of parameter values. The tasks may be stored in a queue and performed one at a time based on their order in the queue. Prior to performing a new task, the parameter values for that task is downloaded to a set of configuration registers. The parameters may be ordered and linked such that only new values are downloaded.

32 Claims, 7 Drawing Sheets

U.S. PATENT DOCUMENTS

| | | | | |
|---|---|---|---|---|
| 5,570,392 | A * | 10/1996 | Young et al. | 375/308 |
| 6,118,808 | A | 9/2000 | Tiemann et al. | 375/210 |
| 6,144,649 | A * | 11/2000 | Storm et al. | 370/335 |
| 6,289,041 | B1 | 9/2001 | Krasner | 375/152 |
| 6,639,906 | B1 * | 10/2003 | Levin | 370/342 |
| 6,711,413 | B1 * | 3/2004 | Heidari | 455/515 |
| 6,763,028 | B2 * | 7/2004 | Fujii | 370/412 |
| 6,954,487 | B2 | 10/2005 | Garyantes et al. | |
| 7,031,271 | B1 * | 4/2006 | LaRosa et al. | 370/311 |
| 7,085,246 | B1 * | 8/2006 | LaRosa et al. | 370/311 |

FOREIGN PATENT DOCUMENTS

| | | |
|---|---|---|
| WO | 0154432 | 7/2001 |
| WO | 0160104 | 8/2001 |
| WO | 0245268 | 6/2002 |

* cited by examiner

BUFFER-BASED GPS AND CDMA PILOT SEARCHER

BACKGROUND

1. Field

The present invention relates generally to communication, and more specifically to a buffer-based pilot searcher for wireless (e.g., GPS and CDMA) communication systems.

2. Background

Wireless terminals (e.g., cellular phones) are designed to provide various types of communication such as voice, data, and so on. These terminals may be capable of communicating with one or more wireless communication systems such as code division multiple access (CDMA), time division multiple access (TDMA) (e.g., GSM systems), and frequency division multiple access (FDMA) systems. Newer generation terminals may also be designed to support other services such as position determination, enhanced emergency 911 (E-911) service, and possibly others. For these services, the terminals may be capable of receiving transmissions from Global Position System (GPS) satellites.

A terminal typically needs to acquire signals transmitted from one or more transmitters (e.g., base stations, GPS satellites) in order to receive or exchange data with a given system. In many wireless communication systems, a pilot is transmitted from each transmitter to assist the terminals perform a number of functions. The pilot is typically generated based on a known data pattern (e.g., a sequence of all zeros) and using a known signal processing scheme (e.g., covered with a known channelization code and spread with either a known pseudo-random noise (PN) sequence or a known scrambling sequence). For some CDMA systems, each base station may be assigned a specific PN offset (e.g., for IS-95 and cdma2000 systems) or a specific scrambling sequence (e.g., for W-CDMA or UMTS system) that is different from those of neighboring base stations to allow the terminals to distinguish the individual base stations. The pilots from the transmitters may be used at the terminals for acquisition, frequency and timing synchronization, channel estimation, data demodulation, and so on.

A searcher is typically used to search for pilots in a received signal. The search for pilots is made challenging due to various physical phenomena and design constraints. First, the pilot is distorted by noise and interference in the communication link, which can make detection of the pilots difficult at the terminal. Second, the searcher may be required to search for pilots in different types of signals, such as CDMA and GPS signals. A searcher design that can provide the required functionality with reduced circuit complexity, size, cost, and power consumption is highly desirable.

SUMMARY

Aspects of the invention provide an efficient searcher that may be used to search for pilots in a received CDMA or GPS signal. In one aspect, the searcher is operated in conjunction with a sample buffer that is used to store samples for the received signal. The searcher and sample buffer may be operated in a number of different modes including a "real-time" mode and an "off-line" mode. In the real-time mode, the sample buffer is used as a circular buffer whereby samples are written to the sample buffer in real-time as they are received and are thereafter retrieved as they are needed for processing. This mode allows for real-time search for pilots in the received signal. In the off-line mode, the sample buffer is used to store a particular time window of samples, and the stored samples may thereafter be retrieved one or more times as needed for processing. To simplify the design of the sample buffer, the writing and reading of samples to and from the sample buffer may be performed in a time division multiplexed (TDM) manner via a common port. Moreover, the samples may be decimated and packed prior to storing in the sample buffer.

In another aspect, the overall search for pilots in the received signal is partitioned into a number of tasks, with each task corresponding to a search over a given segment of samples and based on a particular set of parameter values. These parameter values may indicate, for example, the start address of the sample buffer where samples are to be retrieved, the specific phase to be used for the interpolation of the samples, the coherent and non-coherent accumulation lengths, and so on. The sets of parameter values for the tasks may be stored in a task queue. The tasks may be performed one at a time and in the order in which they appear in the queue. Prior to performing a new task, the set of parameter values for that task is downloaded to a set of configuration registers. The parameter values for these registers may be ordered and linked such that only new parameter values for the new task needs to be downloaded (and some of the old parameter values for the prior task may be retained and used for the new task). The search processing for the new task is then performed in accordance with the register configurations.

Various aspects and embodiments of the invention are described in further detail below. The invention further provides methods, searchers, digital signal processors, receiver units, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
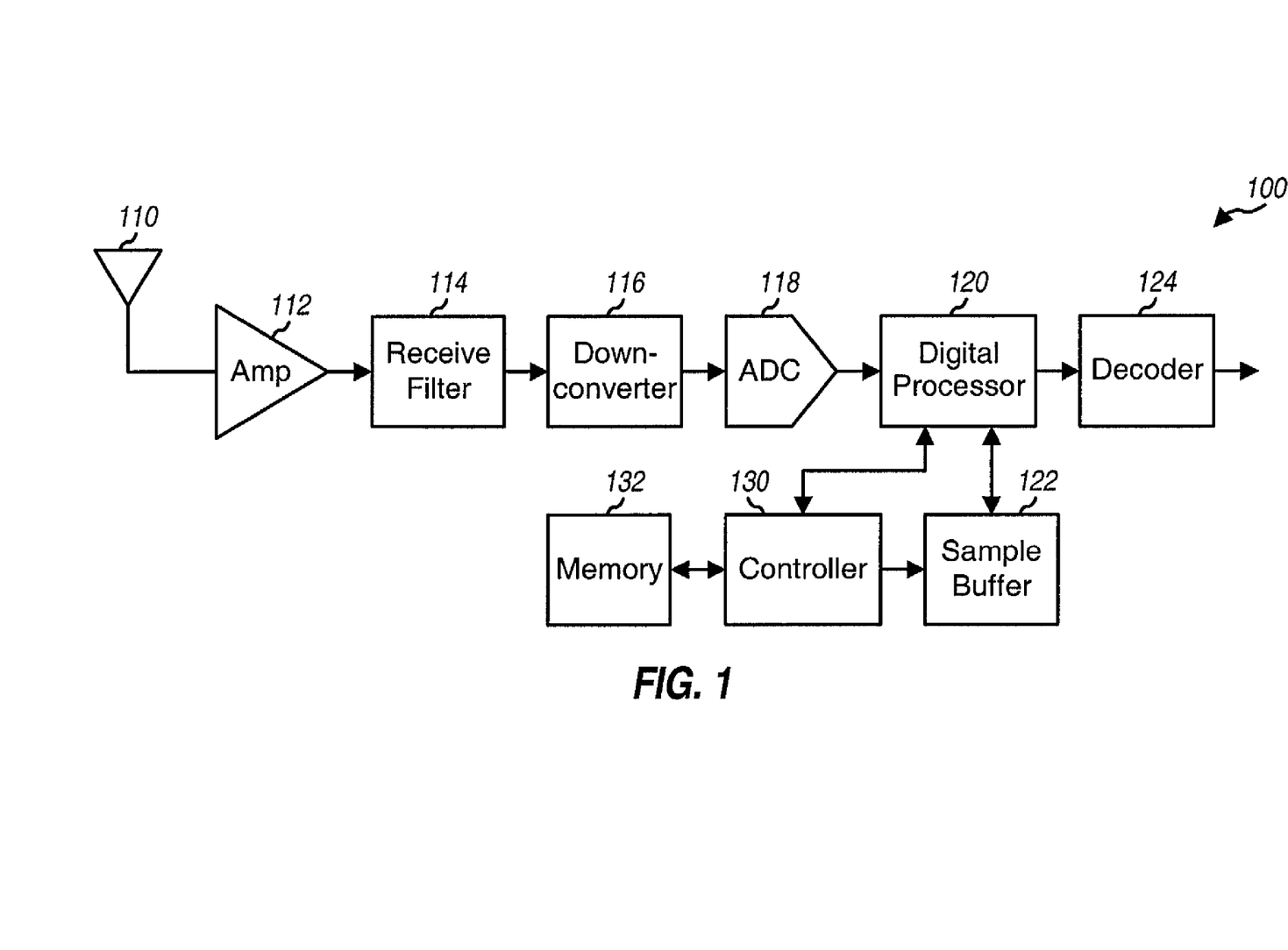
FIG. 1 is a block diagram of an embodiment of a receiver unit.

FIG. 1 is a block diagram of an embodiment of a receiver unit 100 capable of implementing various aspects and embodiments of the invention. Receiver unit 100 may be implemented within a terminal (e.g., a cellular phone) that may be used in one or more wireless communication systems, such as CDMA and GPS systems. For clarity, specific design values (e.g., for sample rates and sample resolution) are provided herein, but other design values may also be used and are within the scope of the invention.

In FIG. 1, one or more RF modulated signals transmitted from one or more transmitters (e.g., base stations, GPS satellites, broadcast stations, and so on) are received by an antenna 110 and provided to an amplifier (Amp) 112. Amplifier 112 amplifies the received signal with one or more low noise amplifier (LNA) stages to provide an amplified RF signal. A receive filter 114 then filters the amplified RF signal to remove noise and spurious signals and provides the filtered RF signal to a downconverter 116.

Downconverter 116 performs quadrature downconversion of the filtered RF signal from RF to baseband. The frequency downconversion may be achieved by a single stage (i.e., from RF directly down to baseband) or with multiple stages (e.g., from RF to IF, and then from IF to baseband). In any case, downconverter 116 provides inphase (I) and quadrature (Q) baseband components to one or more analog-to-digital converters (ADCs) 118.

ADCs 118 digitize the I and Q baseband components to provide I and Q sample streams, respectively. ADCs 118 may be implemented with various ADC designs, such as with sigma-delta modulators. In a specific embodiment, ADCs 118 provide 4-bit I samples and 4-bit Q samples at eight times the chip rate (i.e., chip×8), with the chip rate being 1.2288 Mcps for some CDMA systems and 1.023 Mcps for the GPS system. The pair of I and Q samples for each chip×8 sample period is packed into an 8-bit IQ sample and provided to a digital processor 120.

Digital processor 120 may perform a number of functions such as filtering, sample rate conversion, searching, demodulation, and so on. Digital processor 120 receives and may store the IQ samples to a sample buffer 122. The stored IQ samples may thereafter be retrieved and processed by digital processor 120 for various functions. For example, digital processor 120 may include a searcher that can search for pilots in the received signal (i.e., the IQ samples for the received signal). Some of the search processing by digital processor 120 is described below. Digital processor 120 may further include a rake receiver that can demodulate the IQ samples for a number of signal peaks, which correspond to strong pilot instances found by the searcher. Digital processor 120 would then provide demodulated data to a decoder 124 for further processing.

A controller 130 directs various operations of receiver unit 100. For example, controller 130 may direct the operation of digital processor 120, decoder 124, and so on. A memory 132 provides storage for data and program codes for controller 130.

In a typical receiver design, the conditioning of the received signal may be performed by one or more stages of amplifier, filter, mixer, and so on. For example, filtering may be provided before and/or after amplifier 112, and is also typically performed after the frequency downconversion. For simplicity, these various signal conditioning stages are lumped together into the blocks shown in FIG. 1. Other RF receiver designs may also be used and are within the scope of the invention. Amplifier 112, filter 114, downconverter 116, and ADCs 118 form an RF front-end unit for receiver unit 100. Digital processor 120, decoder 124, and controller 130 may be implemented within one or more integrated circuits (ICs), e.g., within a single application specific integrated circuit (ASIC).

Searcher

To receive or exchange data with a CDMA or GPS system, the receiver unit needs to search for and acquire to the system. For a CDMA system, this typically entails searching a received signal for pilots that are included in the signals transmitted from CDMA base stations. And for the GPS system, since the GPS signals transmitted from GPS satellites do not include pilots but instead include (50 Hz) data modulated with Gold code sequences, the GPS searching is typically performed by first removing the data to recover the Gold code sequences.

To generate a pilot at a CDMA base station, pilot data is initially covered with a particular channelization code, and further spread with a PN sequence with a specific PN phase (or PN state) assigned to the base station. The different PN phases for different base stations allow the terminals to identify and distinguish the individual base stations. To simplify the signal processing at both the base stations and the terminals, CDMA systems typically use a sequence of all zeros for the pilot data and a channelization code of zero (e.g., Walsh code zero) for the pilot channel. Thus, the pilot is effectively the PN sequence assigned to the base station. Analogously, the signal transmitted from each GPS satellite is spread with a specific Gold code sequence assigned to that satellite.

At the terminal, the pilot from a particular base station may be recovered by processing the received signal in a manner complementary to that performed at the base station. The processing at the terminal typically includes (1) conditioning and digitizing the received signal to provide data samples, (2) despreading the data samples with a PN sequence at a specific PN phase that matches the PN phase of the pilot being recovered, (3) decovering the despread samples with the same channelization code used to cover the pilot data at the base station, and (4) accumulating the decovered samples over a particular time period. If the pilot data is a sequence of all zeros and the channelization code is zero, then the processing to recover the pilot simply includes despreading the data samples with the PN sequence and accumulating the despread samples over an integer multiple of the channelization code length (to remove the data transmitted on other traffic channels).

The search for pilots in the received signal is made challenging due to various physical phenomena. First, the signal transmitted from a given base station may be received by the terminal via multiple signal paths. The received signal at the terminal may thus include a number of signal instances from a number of base stations. Second, the signal instances in the received signal may have wide-ranging signal amplitudes due to fading and multipath effects. A searcher is then used to search for strong pilot instances in the received signal.

Since the exact phase of the pilot from each base station is not known a priori (e.g., due to unknown propagation delay and multipath effects), the searcher typically correlates the data samples with PN sequences for a range of PN phases centered around a nominal PN phase where the pilot is suspected. This range of PN phases defines the "code space" to be searched, and each specific PN phase in the code space corresponds to a hypothesis. The searcher may search through the entire code space of 32,768 PN chips if no information is known a priori about the pilot. For each hypothesis, the searcher performs a correlation of the data samples with the PN sequence at the specific PN phase for that hypothesis and provides the result of the correlation.

A linear feedback shift register (LFSR) is often used to generate the PN sequence and is reset to a known state or PN phase based on system time. A "modified" PN sequence at a different PN phase may be generated by applying a PN mask to the PN sequence from the LFSR, as is known in the art. Typically, PN masks for every, e.g., 64 PN chips are stored in a memory, and the phase of the PN sequence from the LFSR may thus be shifted in coarse increments of 64 PN chips. The masked PN sequence may thereafter be moved to the desired PN phase by "slewing" the PN generator in either the forward or reverse direction (e.g., by manipulating the clock signal applied to the LFSR), as is known in the art.

Figure 2:
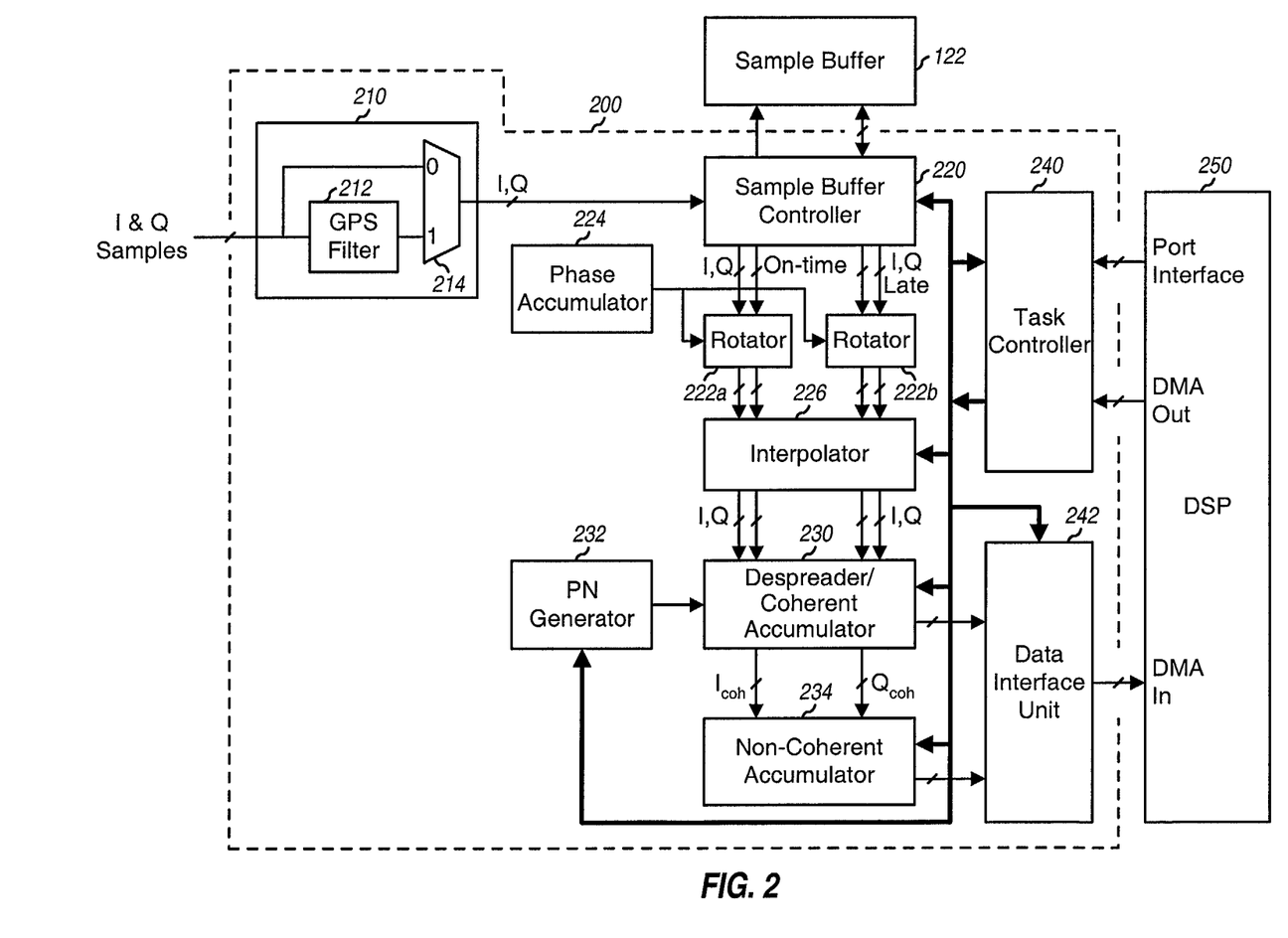
FIG. 2 is a block diagram of a specific embodiment of a searcher capable of implementing various aspects and embodiments of the invention.

FIG. 2 is a block diagram of a specific embodiment of a searcher 200 capable of implementing various aspects and embodiments of the invention. Searcher 200 may be implemented within digital processor 120 in FIG. 1. Searcher 200 may be operated to process a received CDMA or GPS signal in conjunction with sample buffer 122 to search for pilots in the received signal and/or to recover messages or data in the received signal. Sample buffer 122 stores IQ samples for the received signal and allows searcher 200 to process the data in real-time or off-line.

Searcher 200 may be operated in a number of operating modes. In a "real-time" mode, the sample buffer is used as a circular buffer whereby IQ samples are written to the sample buffer in real-time as they are received by the searcher and are thereafter retrieved as they are needed for processing. This mode allows for real-time search for pilots in the received signal. In an "off-line" mode, the sample buffer is used to store a particular time window of IQ samples, and the stored samples may thereafter be retrieved one or more times as needed for processing. This mode may be used to process a quick paging channel whereby page indicator bits targeted for the terminal are transmitted, if at all, at designated times and only samples for the designated times need to be stored.

Searcher 200 may also be operated in a CDMA mode, a GPS mode, and a quick paging channel mode to respectively process a CDMA signal, a GPS signal, and a quick paging channel in CDMA. The CDMA and GPS modes may be used in conjunction with the real-time mode (or possibly the off-line mode), and the quick paging channel mode may be used in conjunction with the off-line mode. Each of the CDMA, GPS, and quick paging channel modes is associated with its own processing requirements. For example, the chip rates for CDMA and GPS signals are different and the signal processing to search for pilots in these signals is also different.

In the specific embodiment shown in FIG. 2, within searcher 200, the 4-bit I and Q samples at chip×8 are provided from ADCs 18 to a selectable filter unit 210 that may be used to provide filtering for a GPS signal. Within unit 210, the input I and Q samples are filtered by a filter 212 that provides match filtering for GPS signal. The input I and Q samples are also provided to a first input of a multiplexer 214, and the filtered samples are provided to a second input of multiplexer 214. Multiplexer 214 then provides samples from the first or second input to the output depending on whether the receiver is processing a CDMA signal or a GPS signal. Unit 210 provides 4-bit I and Q samples at chip×8.

In an embodiment, a sample buffer controller 220 receives the I and Q samples from selectable filter unit 210, downsamples the samples from chip×8 to chip×2, packs the decimated samples, and stores the packed samples to sample buffer 122. In an embodiment, each packed sample corresponds to one "word" and includes a pair of "on-time" I and Q samples and a pair of "late" I and Q samples (four samples in all) for one chip period. Sample buffer controller 220 further retrieves packed samples from the sample buffer as they are needed for processing, unpacks the retrieved samples, and provides the unpacked on-time and late IQ samples to rotators 222a and 222b, respectively. The storage and retrieval of the samples are described in further detail below.

To search for pilots in the received signal, samples from sample buffer 122 are retrieved and processed to detect for the pilots. Sample buffer controller 220 retrieves the stored samples, one word at a time. For each retrieved word, sample buffer controller 220 provides the on-time I and Q samples to rotator 222a and the late I and Q samples to rotator 222b. Each rotator 222 also receives a respective complex carrier signal with a particular phase from a phase accumulator 224, multiplies the received I and Q samples with the complex carrier signal, and provides phase-rotated I and Q samples to an interpolator 226. Rotators 222a and 222b attempt to remove phase rotation in the samples caused by (1) frequency error in the downconversion from RF to baseband and/or (2) Doppler shift in frequency due to movement by the terminal.

Interpolator 226 receives the phase-rotated on-time and late I and Q samples at chip×2, interpolates or resamples these samples at a specific phase, and provides interpolated I and Q samples at the same chip×2 but at the specific phase. In an embodiment, the specific phase is determined by a digital signal processor (DSP) 250 and has chip×8 resolution. The interpolation may be performed by upsampling the input samples from chip×2 to chip×8 (e.g., by zero filling), filtering the zero-filled samples with a particular frequency response, and decimating or downsampling the filtered samples from chip×8 back to chip×2 to obtain output samples at chip×2. Interpolated samples at one of eight different phases may be obtained by selecting the proper filtered samples to retain and provide as the output samples. The selected one of the eight possible phases corresponds to the specific phase determined by DSP 250. Thus, even though the input and output samples for interpolator 226 may be at the same chip×2 rate, the output samples have the higher chip×8 time resolution.

A PN generator 232 generates and provides a PN sequence or a Gold sequence at a specific PN phase (or PN state) corresponding to a hypothesis being evaluated. PN generator 232 may further invert the Gold sequence based on a control bit from a task controller 240, as described below, to invert the despread data. The PN or Gold sequence at the desired PN phase may be obtained by applying an appropriate PN mask to obtain an initial PN state and then slewing the PN generator by a particular number of chips to obtain the desired phase.

A despreader/coherent accumulator 230 receives and despreads the interpolated I and Q samples from interpolator 226 with the PN or Gold sequence from PN generator 232 and provides despread samples. The despread samples are then coherently accumulated over $N_C$ chips, which is an integer multiple of the length of the channelization code used for the pilot at the transmitter. For IS-95 and cdma2000 systems, the pilot is channelized with a Walsh code of zero, which is a sequence of 64 zeros. For CDMA processing, despreader/accumulator 230 accumulates despread I samples for $N_C$ chip periods (where $N_C=64 \cdot N$ and N is an integer one or greater) to provide a coherently accumulated I value, $I_{coh}$, and similarly accumulates despread Q samples for $N_C$ chip periods to provide a coherently accumulated Q value, $Q_{coh}$.

To expedite the search process, the I and Q samples may be despread and coherently accumulated for multiple (e.g., 16) hypotheses for a given search task. For the GPS mode, non-coherent accumulation is not performed and the $I_{coh}$ and $Q_{coh}$ values for all hypotheses are provided to a data interface unit 242, which formats and provides these values to DSP 250.

For the CDMA mode, a non-coherent accumulator 234 performs non-coherent accumulation of the $I_{coh}$ and $Q_{coh}$ values for each hypothesis. The non-coherent accumulation may be performed by (1) squaring each of the $I_{coh}$ and $Q_{coh}$ values, (2) summing each pair of squared values to generate a sum of squares (i.e., $I_{coh}^2 + Q_{coh}^2$) and (3) accumulating $N_{NC}$ sums of squares to provide a correlated value that is indicative of the strength of the recovered pilot for this hypothesis. In one embodiment, the non-coherently accumulated results are provided to data interface unit 242, which formats and forwards these results to DSP 250. In another embodiment, non-coherent accumulator 234 performs post-processing on the non-coherently accumulated results, which may include some of the functions normally associated with peak detection. The post-processing may thus include sorting the results for all hypotheses being evaluated for the current search task, comparing the sorted results against a threshold, and providing results that exceed the threshold to data interface unit 242.

A task controller 240 directs the operation of various functional units within searcher 200, such as sample buffer controller 220, interpolator 226, PN generator 232, and accumulators 230 and 234. Task controller 240 receives from DSP 250 the various parameter values to be applied to these functional units and provides the proper control to these units. Data interface unit 242 receives the results from accumulators 230 and 234, packs these results into the proper format (e.g., as indicated by task controller 240), and provides the packed results to DSP 250. The operation of task controller 240 and data interface unit 242 is described below.

DSP 250 directs the operation of searcher 200 and other elements within receiver unit 100. For example, DSP 250 may direct searcher 200 to search for pilots in a received CDMA or GPS signal by commanding the searcher to perform a number of search tasks, with each such task being performed for a designated time period of samples and based on a specific set of parameter values. The control for a search operation is described below. DSP 250 may be implemented as a part of controller 130 in FIG. 1.

In FIG. 2, searcher 200 may be implemented within digital processor 120 in FIG. 1. Digital processor 120 may also include various other functional units that may be used in receiver unit 100. For example, digital processor 120 may include a rake receiver having a number of finger processors capable of concurrently demodulating a number of signal instances in the received signal, as found by the searcher. Rotators 222, interpolator 226, despreader/coherent accumulator 230, and non-coherent accumulator 234 collectively comprise the processing unit for searcher 200.

Sample Buffer and Sample Buffer Controller

Figure 3A:
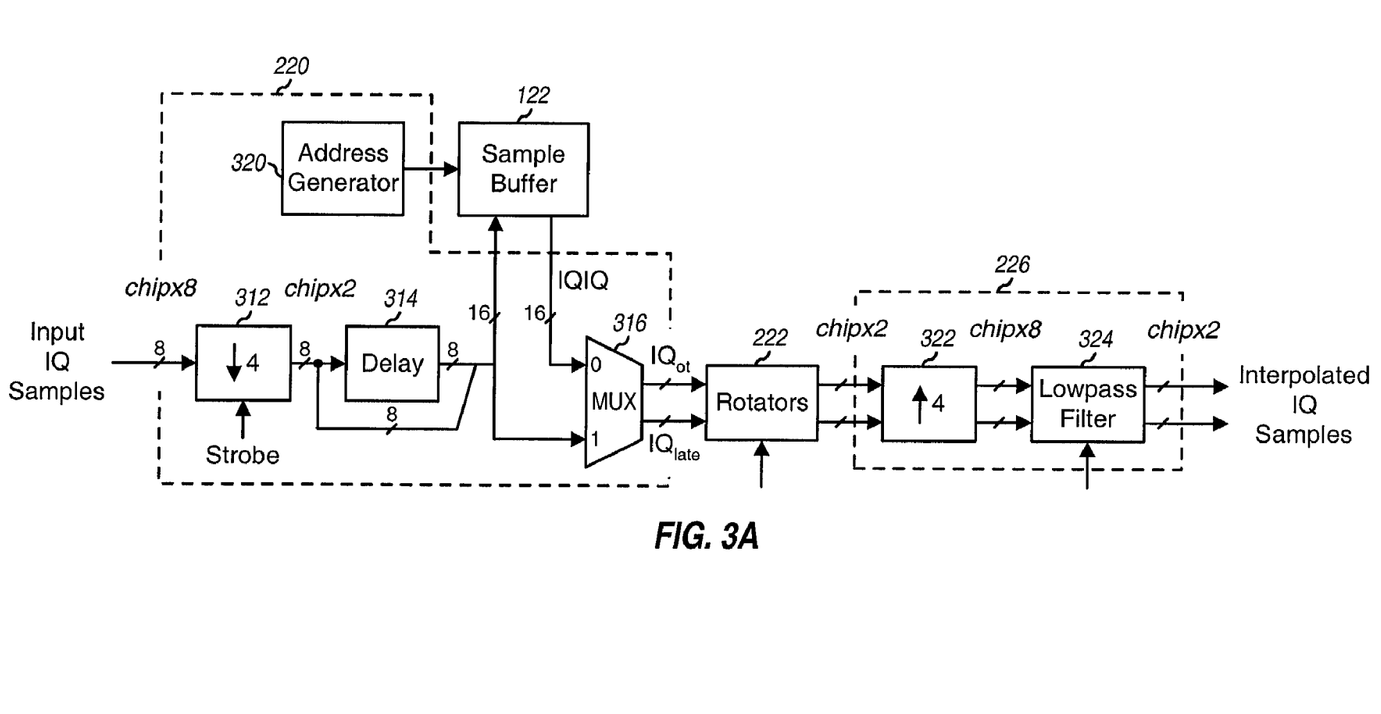
FIGS. 3A and 3B are block diagrams of a specific embodiment of a sample buffer controller and a sample buffer, respectively.

FIG. 3A is a block diagram of a specific embodiment of sample buffer controller 220 and interpolator 226. Within sample buffer controller 220, the input IQ samples from selectable filter unit 210 are provided to a downsampler 312, which decimates the samples from chip×8 down to chip×2. Decimated samples at a specific phase are stored to sample buffer 122, as described below. The decimation reduces the number of IQ samples to be stored in the sample buffer by a factor of four. Thus, storing the decimated chip×2 samples instead of the input chip×8 samples reduces the buffer requirement for a given time period of samples or allows a longer time period of samples to be stored for a given buffer size.

For each chip period, downsampler 312 provides a pair of on-time I and Q samples followed by a pair of late I and Q samples. The on-time I and Q samples are then delayed by half-chip period by a delay element 314 to time-align these samples with the later-arriving late I and Q samples. The on-time I, on-time Q, late I, and late Q samples (i.e., four samples in all) for each chip period are then packed into a single word that is then provided to sample buffer 122 for storage.

Words of IQIQ samples are thereafter retrieved from sample buffer 122 as they are needed for processing. The retrieved words are provided to a first input of a multiplexer 316 and the decimated and packed IQIQ samples are provided to a second input of the multiplexer. Multiplexer 316 then provides the retrieved IQIQ samples if the sample buffer is being used and the packed IQIQ samples if the sample buffer is bypassed. The on-time IQ sample and the late IQ sample for each chip period are provided from multiplexer 316 to the subsequent processing unit (e.g., rotators 222a and 222b).

An address generator 320 controls the writing of samples into sample buffer 122 and the reading of samples from the sample buffer. The specific address in the sample buffer to write or read a word is determined by task controller 240, as described below.

The retrieved on-time and late IQ samples are provided to rotators 222a and 222b, respectively, which perform phase rotation to remove large frequency error in the samples. To provide I and Q samples at the chip×8 timing resolution needed by the subsequent processing units, the phase-rotated IQ samples are interpolated from chip×2 timing to chip×8 timing and at the specific phase determined by DSP 250. Within interpolator 226, an up-sampler 322 performs 4 times upsampling by inserting three zeros between each pair of phase-rotated I samples and three zeros between each pair of phase-rotated Q samples. The zero-filled I samples are then filtered by a digital lowpass filter 324 to provide interpolated I samples at chip×8, and the zero-filled Q samples are similarly filtered by digital lowpass filter 324 to provide interpolated Q samples at chip×8. Upsampler 322 and filter 324 thus perform interpolation of the I and Q samples from chip×2 to chip×8. The filtered I and Q samples at chip×8 are then decimated back down to chip×2 by selecting samples at the desired chip×8 phase (i.e., one of the eight possible chip×8 phases) to provide as the interpolated I and Q samples.

In an embodiment, two clocks, a "main" clock and a "sampling" clock, may be provided by a clock generator and used by searcher 200. The main clock is used to perform interpolation by interpolator 226 and for other search processing (e.g., phase rotation and coherent accumulation). This main clock may be a high speed clock (e.g., at 32 times the chip rate or possibly higher), which would then allow the processing units within searcher 200 to perform more computations per unit time. The sampling clock is used by sample buffer controller 220 to latch the incoming IQ samples from selectable filter unit 210. The sampling clock is provided by a clock source that is locked or related to the type of received signal being processed (e.g., CDMA or GPS). The main clock and the sampling clock may be synchronous or asynchronous.

In the CDMA mode, the incoming IQ samples from selectable filter unit 210 are provided at chip×8 but stored to the sample buffer at chip×2. A strobe signal is used to capture the proper decimated IQ samples (i.e., the samples at the desired chip×8 phase) for storage. This strobe signal may be generated based on a reference counter. The reference counter is reset to zero upon receiving an epoch command indicating the start of a new epoch, which is a time period with a known start time and duration. Thereafter, the reference counter increments its count by one for each period of a chip×8 clock. The reference counter is used to keep track of the amount of time that has elapsed since the start of the epoch. The on-time IQ samples to be captured and stored in the sample buffer may then be selected to be the incoming IQ samples at a particular reference counter phase (e.g., when the three least significant bits (LSBs) of the reference count are equal to zero). Similarly, the late IQ samples to be captured and stored may be selected to be the incoming IQ samples at another reference counter phase that is four chip×8 sample periods away (e.g., when the three LSBs of the reference counter are equal to four).

In the GPS mode, the incoming IQ samples from selectable filter unit 210 are also provided at chip×8. Similarly, the strobe signal is used to latch the incoming IQ samples such that the proper on-time and late IQ samples are stored. For GPS, the proper I and Q samples are determined relative to the 1.0 msec frame boundary, which corresponds to the start of a data bit. GPS is more sensitive to correct timing since any ambiguity in timing translates to uncertainty in pseudo-ranges used to estimate position. The strobe signal is thus generated with its timing aligned to the 1 msec boundary. In particular, the strobe signal may be generated based on a reference counter that is clocked by a higher rate (e.g., chip× 8) clock, and the phase for the strobe signal may be determined by decoding the three LSBs of the reference counter in a similar manner as that described above.

Figure 3B:
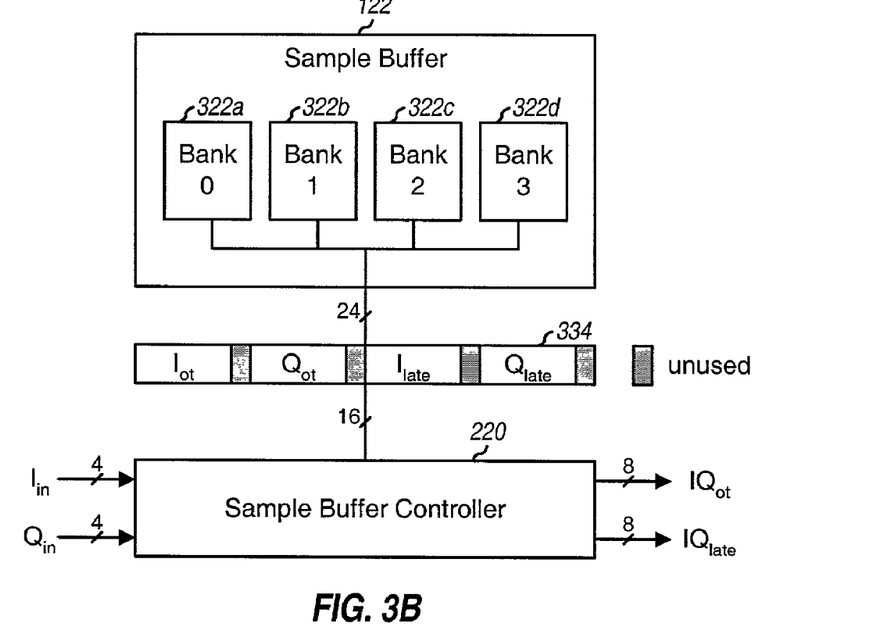

FIG. 3B is a diagram of a specific embodiment of sample buffer 122. In this embodiment, sample buffer 122 is implemented with four memory banks 332a through 332d, which are designated to store the on-time I, on-time Q, late I, and late Q samples, respectively. The size of each memory bank 332 is dependent on various design factors such as the search length, the processing speed of the searcher, and so on. In a specific embodiment, each bank is capable of storing 12,288 samples at chip×2, which is approximately 5 msec of data at 1.2288 Mcps rate.

In an embodiment, sample buffer 122 is implemented using memory that may be used for some other purpose within receiver unit 100. As noted above, receiver unit 100 may be designed to process various types of signals, such as those transmitted from CDMA base stations and GPS satellites. For a CDMA signal, the I and Q samples are demodulated (e.g., despread, decovered, and data demodulated) to provide demodulated symbols that are then deinterleaved and decoded to recover the transmitted data. The deinterleaving is performed using a RAM memory to store a frame of symbols over which interleaving was performed at the transmitter.

For a CDMA signal, if a traffic channel is not being processed, then the RAM memory used for the deinterleaver is not needed and may be used to implement the sample buffer. And if a low rate traffic channel is being processed, then all of the RAM memory allocated for the deinterleaver may not be used, and a portion of this memory may be used to implement the sample buffer. Similarly, for a GPS signal, the deinterleaving is not required and the RAM memory may be used to implement the sample buffer. In general, the sample buffer may be implemented with any memory within the receiver unit if that memory is not being used exclusively for a particular function (e.g., the deinterleaver memory may be use for the sample buffer for GPS searching). With this implementation, no additional memory may be required to implement the sample buffer.

As shown in FIG. 3B, the four memory banks 332a through 332d are multiplexed to appear as a single contiguous memory with four times the width of the individual banks. These banks may be taken from the deinterleaver as noted above, and each may have a size of, e.g., 6144×6, where the 6-bit width is needed to store the higher-resolution demodulated symbols. In this case, the overall size of the sample buffer would be 6144×24. Since the I and Q samples are only 4 bits wide, two of the bits in each bank may be left unused. A word with the on-time and late I and Q samples for each chip period may then have a format 344 shown in FIG. 3B.

Figure 3C:
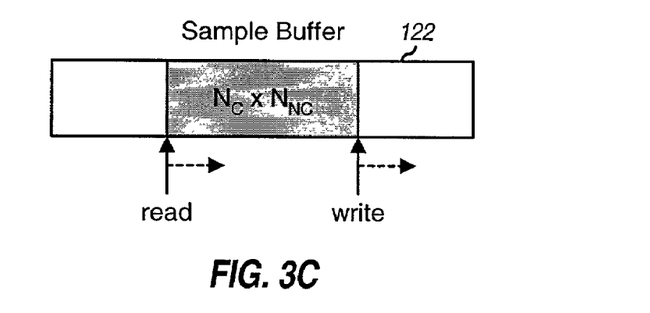
FIGS. 3C and 3D are diagrams that illustrate the use of the sample buffer as a circular buffer for the real-time mode and as a storage buffer for the off-line mode, respectively.

FIG. 3C is a diagram that illustrates the use of sample buffer 122 as a circular buffer for the real-time mode. The circular buffer is associated with a read pointer and a write pointer that may be maintained by address generator 320. The write pointer indicates the specific address or location in the sample buffer where the next word of four I and Q samples is to be written to. Correspondingly, the read pointer indicates the specific address where the next word is to be read from. After each read/write operation, the read/write pointer is incremented and advances forward. When a pointer reaches the end of the sample buffer, it is rolled over and starts again at the beginning of the buffer.

To ensure data integrity, the read and write pointers are maintained such that they do not overlap. At the start of a search task, the read and write pointers may be initialized to their respective starting points in the sample buffer such that (1) the likelihood of such pointer overlap event is minimized and (2) the searcher is provided with the maximum amount of time to perform the search processing. For example, if the searcher is to perform coherent accumulation over $N_C$ chip periods and non-coherent accumulation over $N_{NC}$ coherently accumulated values, then the read pointer may be initialized to $N_C \cdot N_{NC}$ chips prior to the write pointer, as shown in FIG. 3C. This will then provide the maximum amount of time for the search processing so that the write pointer will least likely overwrite the data to be used.

In the real-time mode, address generator 320 continually increments the write pointer as samples are stored to sample buffer 122 at chip×2 rate and further continually increments the read pointer as samples are retrieved from the sample buffer.

Figure 3D:
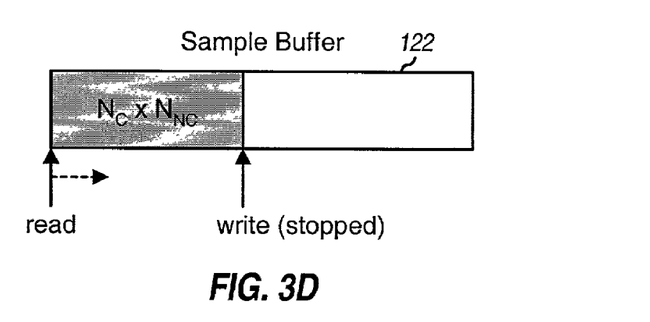

FIG. 3D is a diagram that illustrates the use of sample buffer 122 for the off-line mode. In the off-line mode, sample buffer controller 220 is used to capture a particular time period of samples once, and the same stored data may thereafter be retrieved one or more times to search for pilots and/or to recover a particular message. As noted above, the off-line mode may be used to process the quick paging channel for page indicator bits assigned to the terminal.

As shown in FIG. 3D, the I and Q samples may be stored via a "record" operation starting at the beginning of the sample buffer. At the end of the record operation, the write pointer would indicate the end of the sequence of samples that have been stored to the sample buffer. For each processing iteration through the stored samples, a particular number of samples may be retrieved from the sample buffer via a "playback" operation. At the start of each playback operation, the read pointer may be initialized to the beginning of the sample buffer or to some other location. The read pointer is thereafter incremented as samples are retrieved.

The start address in the sample buffer and the record/playback length may be specified in terms of the number of chip×2 IQ samples to be stored/retrieved. For example, to record 1000 chip×2 IQ samples starting at the beginning of the buffer, the sample buffer may be addressed starting at location 0 with a length of 1000. To skip the first 16 IQ samples on playback, the sample buffer is addressed starting at location 16 with a length of 984. The record and playback functions are independent and can use different start addresses and lengths.

Figure 3E:
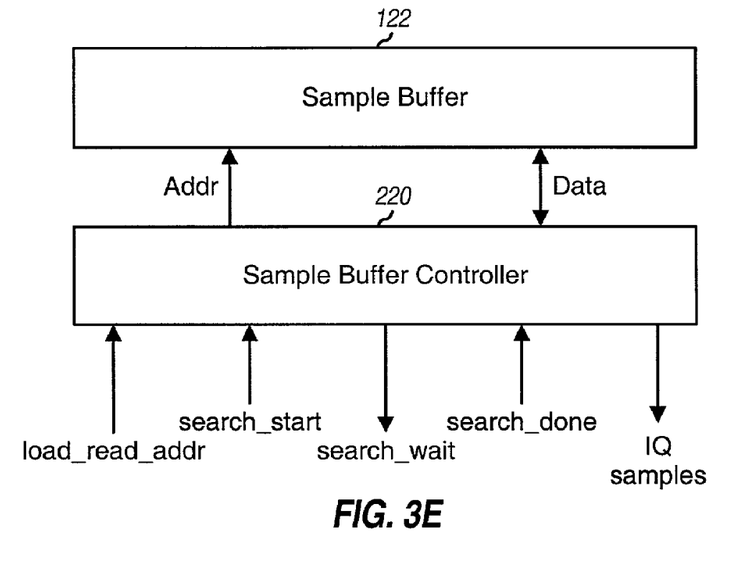
FIG. 3E is a diagram illustrating a specific embodiment of the interface between the sample buffer controller and the sample buffer and the searcher processing unit.

FIG. 3E is a diagram illustrating a specific embodiment of the interface between sample buffer controller 220 and sample buffer 122 and the searcher processing unit. This interface supports both real-time and off-line modes. In an embodiment, to reduce the number of signal lines and simplify the sample buffer design, only one port with one set of data lines is used for both writing IQ samples to the sample buffer and reading IQ samples from the sample buffer.

For the real-time mode, the data lines between sample buffer controller 220 and sample buffer 122 are used in a time division multiplexed (TDM) manner such that both write and read are supported via the same port. In an embodiment, the searcher is operated at multiple (e.g., 32) times the chip rate. In this case, the port may be used to store the packed IQIQ samples at the chip rate (e.g., one chip×32 clock cycle in each chip period may be used to store the on-time and late IQ samples for the chip period). The remaining (e.g., 31) clock cycles in each chip period may then be used to retrieve the stored IQ samples for processing by the searcher.

Sample buffer controller 220 is provided with a load_read_address signal that directs it to reload the read pointer. Thereafter, for each (e.g., chip×32) clock cycle, the sample buffer controller may be commanded to provide a word of on-time and late IQ samples to the searcher at the current address indicated by the read pointer. The sample buffer controller also provides a search_wait signal to indicate that the searcher should hold off on the processing of the next word of IQ samples because a word of incoming IQ samples is being written to the sample buffer and the stored IQ samples cannot be retrieved via the same port. The sample buffer controller can thus arbitrate use of the single port on the sample buffer via the search_wait signal, and the searcher can temporarily stop processing upon receiving an indication to stop. The sample buffer controller provides the retrieved IQ samples to the searcher.

For the off-line mode, the searcher provides a search_start signal and a search_done signal that indicate when to start the playback of the stored samples and when to stop the playback, respectively. These signals may be used to retrieve a particular number of IQ samples from the sample buffer.

Task Linking for Search Operation

In an embodiment, searching may be achieved by performing a set of one or more search tasks. Each such search task corresponds to a search over a given segment of samples and based on a particular set of parameter values. Any number of search tasks may be performed for a given search operation, and the parameter values to be used for each task may be stored in a task queue and downloaded to the searcher prior to performing the task.

Figure 4:
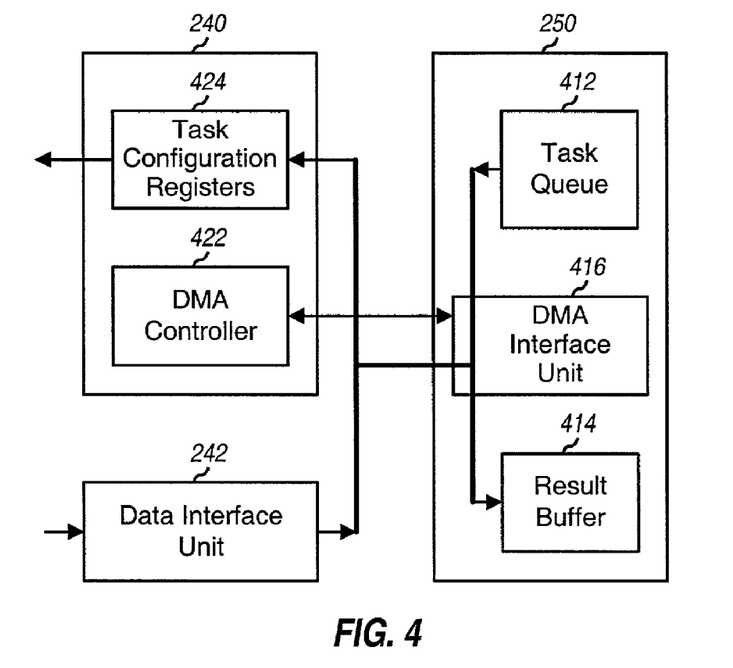
FIG. 4 is a diagram illustrating the interface between the searcher and a DSP used to control search operation.

FIG. 4 is a diagram illustrating the interface between searcher 200 and DSP 250, which can control the search operation. In an embodiment, searcher 200 supports queue-based multiple-task search operation.

Within DSP 250, a task queue 412 is implemented on a particular memory bank that is selected from among a number of memory banks available to the DSP. The task queue may store any number of search tasks, and the tasks to be performed by the searcher may be ordered by their locations in the queue. Each task is defined by a respective set of parameter values that may be downloaded from the task queue and programmed into a set of task configuration registers 424 maintained within task controller 240. These register configurations specify various parameters for the search processing, such as the specific samples to be operated on, the PN state of the PN sequence, the coherent and non-coherent accumulation lengths, and so on.

For a given search operation (which may include one or more search tasks), DSP 250 provides to task controller 240 a start command that indicates (1) the identity of the specific memory bank used to implement the task queue, (2) the starting address of the task queue in this memory bank, and (3) a task count indicative of the number of search tasks in the queue. Upon receiving this start command, a direct memory access (DMA) controller 422 within task controller 240 fetches (i.e., downloads) the parameter values for the tasks in task queue 412 via a DMA interface unit 416, one task at a time.

For each search task to be performed, the parameter values for the task are downloaded from task queue 412 and programmed into the (e.g., six) task configuration registers 424 within task controller 240. In an embodiment, the parameter values for the task configuration registers are downloaded in a specific order. For example, the parameter values for task configuration register 1 are downloaded first, then the parameter values for task configuration register 2 are downloaded next, and so on. In the task queue, the parameter values for each task configuration register include a link to the parameter values, if any, for the next task configuration register to be downloaded. In particular, the last bit in each task configuration register (which is referred to as the queue-link bit) may be set or reset to indicate whether or not there are parameter values in the queue to be downloaded for the next task configuration register. If the queue-link bit for the current task configuration register being downloaded is set to one, then the parameter values for the next task configuration register are available in the task queue and will be downloaded. Otherwise, if the queue-link bit is set to zero, then no more parameter values will be downloaded from the task queue for the current task.

The linking scheme for the task configuration registers provides several advantages. First, the size of the task queue may be reduced since only new parameter values not yet programmed in the task configuration registers need to be stored in the task queue. A search operation may include a number of tasks, and these tasks may be similar to one another and may be associated with the same or similar parameter values. In this case, duplicated parameter values need not be stored in the task queue, which then reduces the memory requirement for the queue. Second, unnecessary downloads and programming of the task configuration registers for duplicate parameter values are avoided, which then reduces the number of unnecessary fetch cycles.

Once all of the parameter values for a given search task have been downloaded from the task queue to task controller 240 and the task configuration registers have been programmed accordingly, the search process begins for that task based on the configurations stored in these registers. Alternatively, the task configuration registers may be programmed directly by the DSP via another bus (e.g., a port interface), as shown in FIG. 2, without going through the task queue.

Searcher 200 performs each search task based on the configurations stored in the task configuration registers. At the end of each search task, data interface unit 242 receives a DMA_start signal from accumulators 230 and 234. Upon receiving this signal, data interface unit 242 rounds, saturates, and appropriately packs the results from the accumulators (e.g., as indicated by configuration registers 4 and 6). The packed data is then sent via DMA interface 416 to result buffer 414 within DSP 250.

In an embodiment, each search task may be performed by passing a token from one processing unit to another. Each processing unit within the searcher is designed to perform a particular function. For a given search task, each processing unit receives a token from a preceding unit, performs its designated function and, upon completion of the function, passes the token to the next unit.

Figure 5:
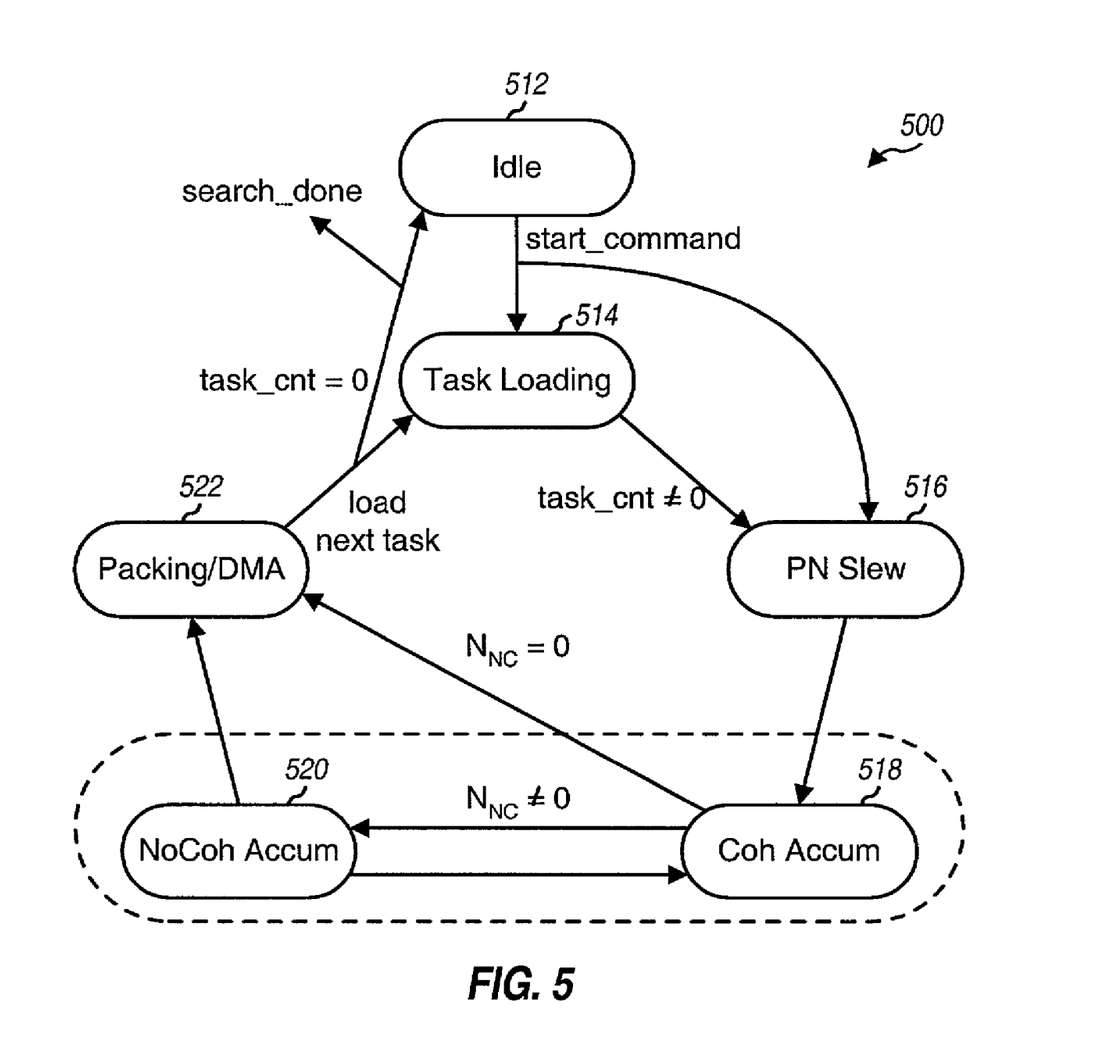
FIG. 5 is a diagram illustrating an embodiment of a token-ring structure for a search task.

FIG. 5 is a diagram illustrating an embodiment of a token-ring structure 500 for a search task. Initially, the searcher is in an idle state 512. Upon receiving the start command from the DSP, the searcher transitions to a task loading state 514 if there are tasks to be downloaded from the task queue, as indicated by the task_cnt field in the start command being not equal to zero (i.e., task_cnt≠0). Alternatively, the searcher transitions to a PN slew state 516 if there are no tasks to be downloaded (i.e., task_cnt=0), which may be the case if the task configuration registers are directly written to by the DSP.

Within task loading state 514, DMA controller 422 downloads the parameter values for the next task from the task queue and programs the task configuration registers. Upon completion of the download for the current task, the searcher transitions to PN slew state 516.

In PN slew state 516, PN generator 232 is programmed to the initial PN state indicated in task configuration 2 and then slewed to the desired PN state indicated by the PN_slew_len field in task configuration 5. Upon completion of the slew, as indicated by a slew_done signal from the PN generator, IQ samples are retrieved from the sample buffer starting at the address indicated in task configuration 1. The retrieved samples are rotated by rotators 222 based on the phase and frequency offset indicated in task configurations 3 and 4, respectively, and further interpolated by interpolator 226 at the specific chip×8 phase indicated in task configuration 4. The interpolated samples are then provided to despreader/coherent accumulator 230.

The searcher then transitions to a coherent accumulation state 518 whereby the interpolated samples are despread and coherently accumulated based on the coherent accumulation length, $N_C$, indicated in task configuration 5. If non-coherent accumulation is to be performed (i.e., $N_{NC}\neq 0$, as indicated in task configuration 5), then the searcher enters a non-coherent state 520 whereby non-coherent accumulation is performed on $N_{NC}$ results from the coherent accumulation. The searcher may transition between states 518 and 520 for as many non-coherent accumulations as indicated in task configuration 5.

Upon completion of all coherent accumulations and non-coherent accumulations, the searcher enters a packing/DMA state 522 whereby data interface unit 242 packs the accumulation results and provides the packed data to result buffer 414 within DSP 250 starting at the address indicated in task configuration 1. The task counter is then decremented. If the task counter is greater than zero, indicating that there are still more tasks to be performed, then the searcher returns to task loading state 514 to download the parameter values for the next task. Otherwise, if the task counter is zero, indicating that all tasks have been performed, then the searcher sends a search_done signal to the DSP and returns to idle state 512 to wait for the next search operation.

Figure 6:
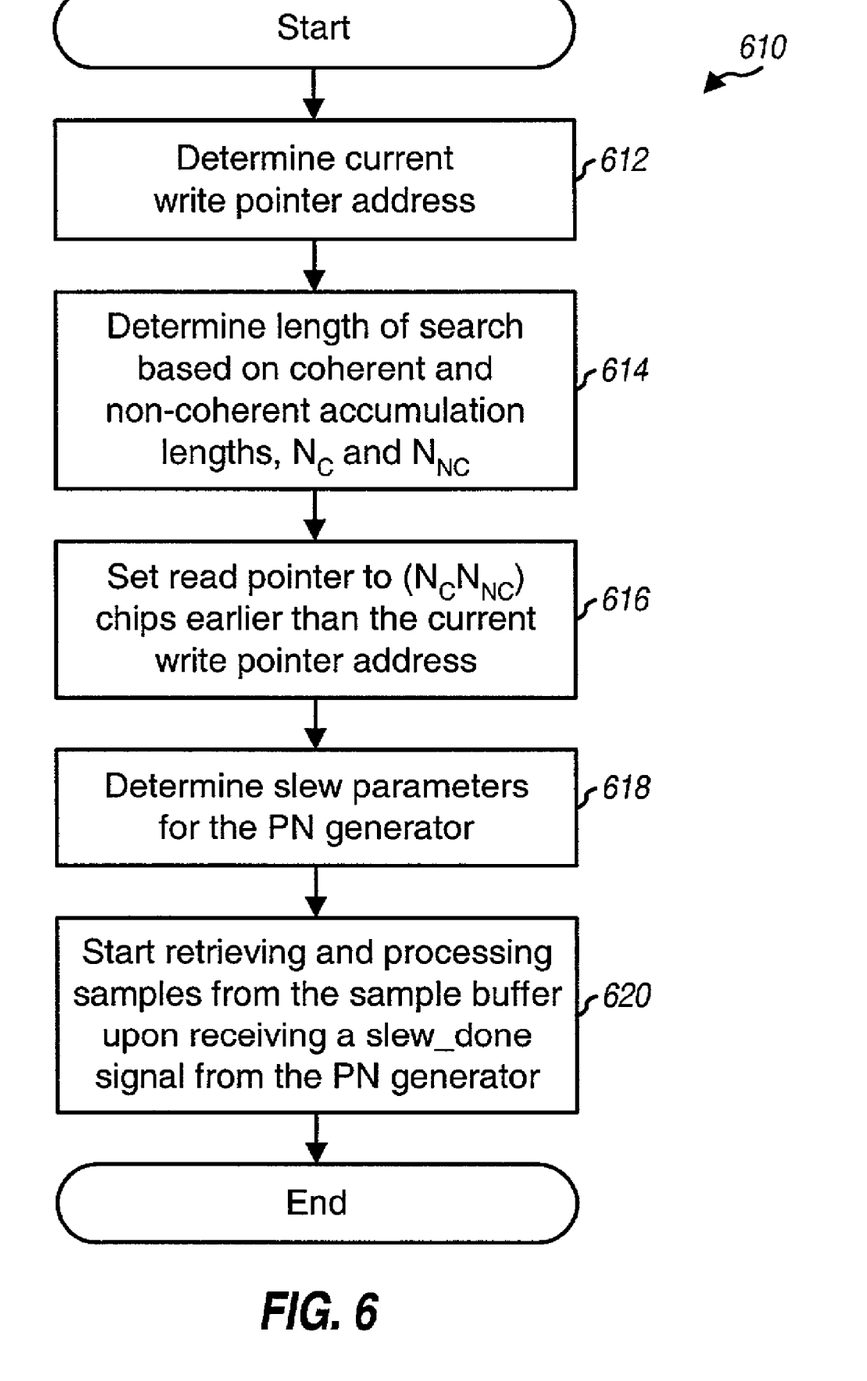
FIG. 6 is a flow diagram of a specific embodiment of a process to set up for a CDMA search task.

FIG. 6 is a flow diagram of a specific embodiment of a process 610 to set up for a CDMA search task. Process 610 may be performed by task controller 240 for each task to search for pilots in a CDMA signal. For the CDMA search, the sample buffer may be used in the real-time mode and IQ samples are continuously stored to the buffer as they are received. Address generator 320 maintains the write pointer, which indicates the address in sample buffer 122 for the next word of IQ samples.

Initially, the current write pointer address and the associated reference count are determined, at step 612. The reference count is obtained from a free-running counter that is used to provide relative time for the receiver unit. The length of the search is then calculated based on the coherent and non-coherent accumulation lengths (i.e., search length=$N_C \cdot N_{NC}$ chips), at step 614. The read pointer is next set to $N_C \cdot N_{NC}$ chips earlier than the current write pointer address to provide the maximum amount of time for the search processing, at step 616. The required slew parameters for the searcher (e.g., the initial PN state to be obtained by PN masking and the required number of slew clock cycles) are then determined, and the PN generator is programmed to slew to the designated PN state, at step 618. Upon receiving the slew_done signal from the PN generator, which indicates that the searcher has moved to the proper PN state, the sample buffer controller starts retrieving samples from the sample buffer and provides the retrieved samples to the processing units within the searcher, at step 620.

The process to set up for a GPS search task may proceed in a similar manner as for a CDMA search task. For the GPS search, the sample buffer may also be used in the real-time mode and IQ samples are continually stored to the buffer as they are received. Initially, the read pointer is set to the start of the 1 msec sample boundary, as determined based on the clock source locked or related to the GPS signal. The required slew parameters for the searcher (e.g., the initial PN state and the required number of slew clock cycles) are then determined and the PN generator is programmed to start the slew. Upon receiving the slew_done signal from the PN generator, the sample buffer controller starts retrieving samples from the sample buffer and provides the retrieved samples to the processing units within the searcher.

The process to set up for the quick paging mode may also proceed in a similar manner. For the quick paging mode, the sample buffer may be used in the offline mode and a specific time duration of IQ samples is stored to the sample buffer. Initially, sample buffer controller 220 is programmed to start recording data at a specified reference count. This reference count corresponds to the specific time when the paging indicator bits for the terminal may be expected. When the specified reference count is reached, IQ samples are stored (or recorded) to the sample buffer at chip×2 and for a particular number of samples (i.e., a particular time duration). When the record operation is finished, the write pointer is stopped.

A search for the page indicator bit for the terminal can then be set up in a similar manner as for the CDMA search described above in FIG. 6. However, the calculations are performed with respect to the reference count at the beginning of the record operation. The required slew parameters for the searcher (e.g., the initial PN state and the required number of slew clock cycles) are determined and the PN generator is programmed to start the slew. Upon receiving the slew_done signal from the PN generator, the sample buffer controller starts retrieving samples from the sample buffer and provides the retrieved samples to the processing units within the searcher.

Frequency tracking for a demodulation for the quick paging mode may be set up as follows. Since the specific reference count corresponding to the start of the record operation is known, the results from the search may be returned relative to this reference count. Based on the current reference count and the relative peaks in the received signal (e.g., found by the search operation), the finger processors of the rake receiver are slewed to the proper PN positions corresponding to the locations of the peaks assigned to the finger processors. The sample buffer controller is then programmed to start the playback operation at a specific reference count that is greater than the maximum finger slew time. And when this reference count is reached, IQ samples are played back to the finger processors.

The resolution and rate of the I and Q samples at various signal processing blocks in the figures included herein are provided for illustration. Different numbers of bits of resolution and different sample rates may also be used for the I and Q samples, and this is within the scope of the invention.

The searcher and searching techniques described herein may be implemented in a terminal or a base station of a wireless communication system. The searcher and searching techniques may also be used for various CDMA systems, such as IS-95, cdma2000, and W-CDMA systems.

The searcher and searching techniques described herein may be implemented by various means. For example, the searcher and supporting units (e.g., the sample buffer) may be implemented in hardware, software, or a combination thereof. For a hardware implementation, the searcher and supporting units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, some of the search processing may be implemented with modules (e.g., procedures, functions, and so on) that perform the functions described herein. The software codes may be stored in a memory unit (e.g., memory 132 in FIG. 1) and executed by a processor (e.g., controller 130). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of processing a received signal in a wireless communication system, comprising:
   using a digital processor for receiving input samples for the received signal;
   storing the input samples to a sample buffer;
   using a sample buffer controller for packing the input samples for each chip period into a single word, wherein one word is stored to the sample buffer for each chip period, and on-time and late inphase and quadrature input samples for each chip period are packed into one word;
   retrieving samples from the sample buffer in a time division multiplexed manner with the storing of the input samples; and
   using at least one processing unit for processing the retrieved samples in accordance with a particular processing scheme.

2. The method of claim 1, wherein samples are stored to and retrieved from the sample buffer via a common port on the sample buffer.

3. The method of claim 1, further comprising: stalling the processing whenever the input samples are stored to the sample buffer.

4. The method of claim 1, further comprising: decimating the input samples from an input sample rate to a lower sample rate, and wherein the decimated samples are stored to the sample buffer.

5. The method of claim 4, wherein the input samples are decimated from eight times chip rate (chip×8) or higher to two times chip rate (chip×2).

6. The method of claim 4, further comprising:
   interpolating the retrieved samples from the lower sample rate to a time resolution at the input sample rate, and wherein the interpolated samples are processed.

7. The method of claim 1, wherein the sample buffer is operated as a circular buffer.

8. The method of claim 7, further comprising: maintaining a write pointer indicative of a current write address in the sample buffer to store the samples for a next write operation; and maintaining a read pointer indicative of a current read address in the sample buffer to retrieve the samples for a next read operation.

9. The method of claim 8, wherein the read pointer is initialized based on the write pointer and a set of parameter values for the processing.

10. The method of claim 1, further comprising: searching for pilots in the received signal.

11. The method of claim 1, further comprising: recovering a quick page indicator bit in the received signal.

12. The method of claim 1, further comprising: despreading the retrieved samples with a code sequence at a specific phase; and coherently accumulating the despread samples for each time duration of a particular number of chips to provide a respective first result.

13. The method of claim 12, further comprising: non-coherently accumulating each group of a particular number of first results to provide a respective second result.

14. The method of claim 12, further comprising: rotating the phase of the retrieved samples, and wherein the phase-rotated samples are despread.

15. A searcher in a wireless communication system, comprising:
   a sample buffer operative to store and provide samples for a received signal;
   a sample buffer controller operative to receive and pre-process input samples, provide the pre-processed samples to the sample buffer for storage, pack the input samples for each chip period into a single word, wherein one word is stored to the sample buffer for each chip period, and on-time and late inphase and quadrature input samples for each chip period are packed into one word, retrieve stored samples from the sample buffer, and provide the retrieved samples, wherein samples are stored to and retrieved from the sample buffer in a time division multiplexed manner via a common port; and
   one or more processing units operative to process the retrieved samples in accordance with a particular processing scheme.

16. The searcher of claim 15, wherein the sample buffer controller is operative to decimate the input samples from an input sample rate to a lower sample rate, and wherein the decimated samples are stored to the sample buffer.

17. The searcher of claim 16, wherein the sample buffer controller is further operative to pack the decimated samples for each chip period into a single word, and wherein the one word is stored to the sample buffer for each chip period.

18. The searcher of claim 15, wherein the sample buffer is operated as a circular buffer.

19. The searcher of claim 15, wherein the sample buffer is implemented with a plurality of memory banks, one memory bank for each sample in a word written to the sample buffer for a write operation.

20. The searcher of claim 15, wherein the sample buffer is implemented with a memory used to implement a deinterleaver for a receiver unit.

21. The searcher of claim 15, wherein the one or more processing units include: a despreader/accumulator operative to despread the retrieved samples with a code sequence at a specific state and to coherently accumulate the despread samples for each time duration of a particular number of chips to provide a respective first result.

22. The searcher of claim 21, wherein the one or more processing units include: a second accumulator operative to non-coherently accumulate each group of a particular number of first results to provide a respective second result.

23. The searcher of claim 21, wherein the one or more processing units include: a rotator operative to rotate a phase of the retrieved samples, and wherein the phase-rotated samples are despread by the despreader/accumulator.

24. The searcher of claim 21, wherein the one or more processing units include: an interpolator operative to interpolate the retrieved samples to derive interpolated samples at a particular phase, and wherein the interpolated samples are despread.

25. An apparatus in a wireless communication system, comprising:
means for receiving and pre-processing input samples for a received signal to provide pre-processed samples;
means for storing the pre-processed samples;
means for packing the input samples for each chip period into a single word, wherein one word is stored to a sample buffer for each chip period, and on-time and late inphase and quadrature input samples for each chip period are packed into one word;
means for retrieving the stored samples from the storing means in a time division multiplexed manner with the storing of the pre-processed samples via a common port; and
means for processing the retrieved samples in accordance with a particular processing scheme.

26. A processor executing instructions for processing a received signal in a wireless communications system, the instructions comprising:
instructions to receive input samples for the received signal;
instructions to store the input samples to a sample buffer;
instructions to pack the input samples for each chip period into a single word, wherein one word is stored to the sample buffer for each chip period, and on-time and late inphase and quadrature input samples for each chip period are packed into the one word;
instructions to retrieve samples from the sample buffer in a time division multiplexed manner with the storing of the input samples; and
instructions to process the retrieved samples in accordance with a particular processing scheme.

27. A method of processing a received signal in a wireless communication system comprising:
using a digital processor for receiving input samples for the received signal;
using a sample buffer controller for storing the input samples for each chip period of input samples in a single word in a sample buffer, and on-time and late inphase and quadrature input samples for each chip period are packed into one word and for retrieving samples from the sample buffer in a time division multiplexed manner with the storing of the input samples; and
processing the retrieved samples in accordance with a particular processing scheme, wherein the sample buffer is operated as a circular buffer.

28. A method of processing a received signal in a wireless communication system, comprising:
using a digital processor for receiving input samples for the received signal;
using a sample buffer controller for storing the input samples for each chip period of input samples in a single word in a sample buffer, and on-time and late inphase and quadrature input samples for each chip period are packed into one word and for retrieving samples from the sample buffer in a time division multiplexed manner with the storing of the input samples; and
processing the retrieved samples in accordance with a particular processing scheme, wherein the processing comprises recovering a quick page indicator bit in the received signal.

29. A searcher in a wireless communication system, comprising:
a sample buffer operative to store and provide samples for a received signal;
a sample buffer controller operative to receive and preprocess input samples, provide the pre-processed samples for each chip period of input samples in a single word to the sample buffer for storage, wherein on-time and late inphase and quadrature input samples for each chip period are packed into one word, retrieve stored samples from the sample buffer, and provide the retrieved samples, wherein samples are stored to and retrieved from the sample buffer in a time division multiplexed manner via a common port; and
one or more processing units operative to process the retrieved samples in accordance with a particular processing scheme, wherein the sample buffer is operative as a circular buffer.

30. A searcher in a wireless communication system, comprising:
a sample buffer operative to store and provide samples for a received signal;
a sample buffer controller operative to receive and preprocess input samples, provide the pre-processed samples for each chip period of input samples in a single word to the sample buffer for storage, wherein on-time and late inphase and quadrature input samples for each chip period are packed into one word, retrieve stored samples from the sample buffer, and provide the retrieved samples, wherein samples are stored to and retrieved from the sample buffer in a time division multiplexed manner via a common port; and
one or more processing units operative to process the retrieved samples in accordance with a particular processing scheme, wherein the sample buffer is implemented with a plurality of memory banks, one memory bank for each sample in a work written to the sample buffer for a write operation.

31. A searcher in a wireless communication system, comprising:
a sample buffer operative to store and provide samples for a received signal;
a sample buffer controller operative to receive and preprocess input samples, provide the pre-processed samples for each chip period of input samples in a single word to the sample buffer for storage, wherein on-time and late inphase and quadrature input samples for each chip period are packed into one word, retrieve stored samples from the sample buffer, and provide the retrieved samples, wherein samples are stored to and retrieved from the sample buffer in a time division multiplexed manner via a common port; and one or more processing units operative to process the retrieved samples in accordance with a particular processing scheme, wherein the sample buffer is implemented with a memory used to implement a deinterleaver for a receiver unit.

32. A searcher in a wireless communication system, comprising:

a sample buffer operative to store and provide samples for a received signal;

a sample buffer controller operative to receive and pre-process input samples, provide the pre-processed samples for each chip period of input samples in a single word to the sample buffer for storage, wherein on-time and late inphase and quadrature input samples for each chip period are packed into one word, retrieve stored samples from the sample buffer, and provide the retrieved samples, wherein samples are stored to and retrieved from the sample buffer in a time division multiplexed manner via a common port; and one or more processing units operative to process the retrieved samples in accordance with a particular processing scheme, wherein the one or more processing units include:

a despreader/accumulator operative to despread the retrieved samples with a code sequence at a specific state and to coherently accumulate the despread samples for each time duration of a particular number of chips to provide a respective first result; and an interpolator operative to interpolate the retrieved samples to derive interpolated samples at a particular phase, and wherein the interpolated samples are despread.

* * * * *

UNITED STATES PATENT AND TRADEMARK OFFICE
CERTIFICATE OF CORRECTION

PATENT NO. : 7,649,860 B2
APPLICATION NO. : 10/061874
DATED : January 19, 2010
INVENTOR(S) : Kang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2327 days.

Signed and Sealed this

Twenty-eighth Day of December, 2010

David J. Kappos
*Director of the United States Patent and Trademark Office*